April 7, 1953

J. A. MARCHAND ET AL 2,634,317

APPARATUS FOR DETERMINING THE ORIENTATION
OF UNDERGROUND STRATA FROM CORE SAMPLES

Filed Feb. 24, 1950

Inventors
Joseph A. Marchand
John Platis

By Clarence A. O'Brien
and Harvey B. Jackson
Attorneys

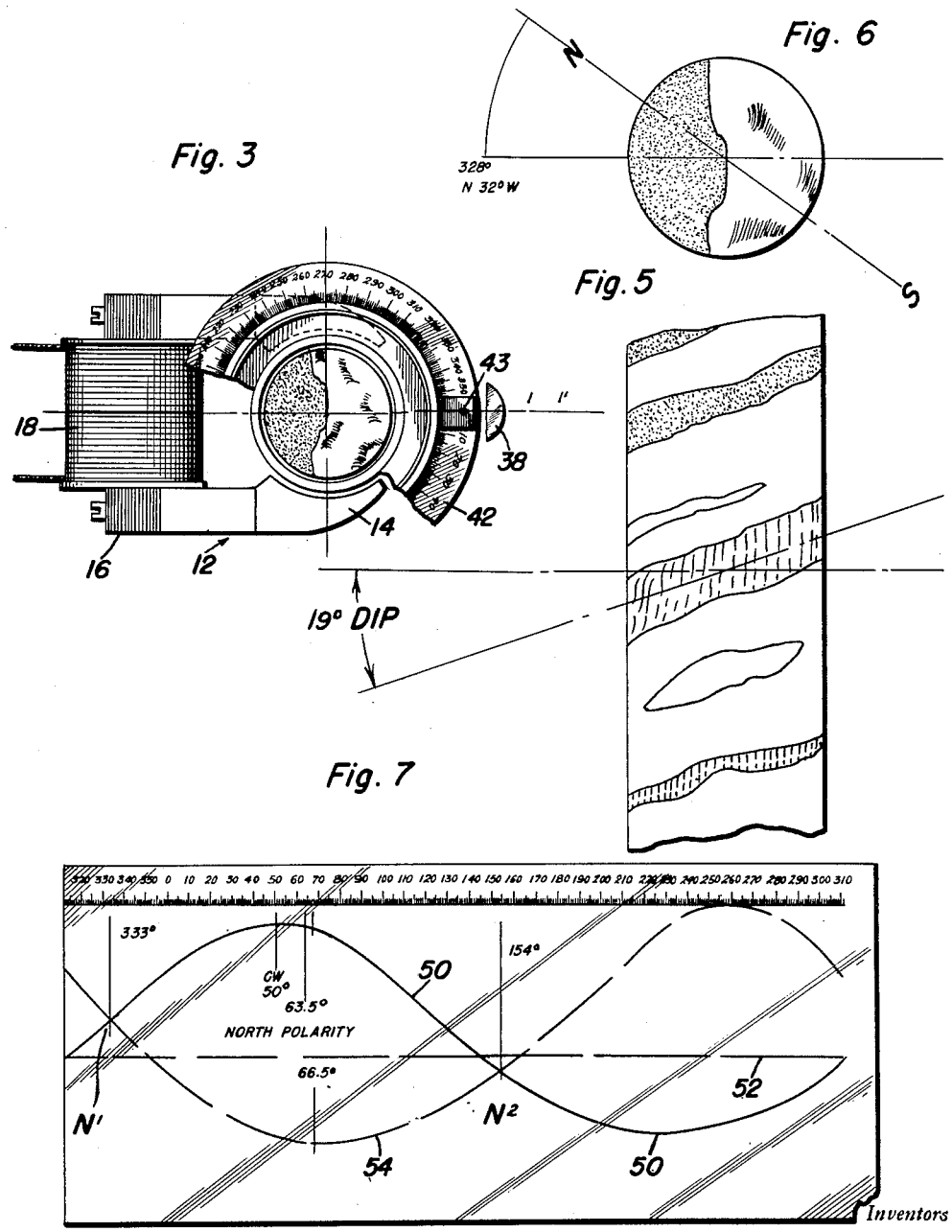

April 7, 1953 J. A. MARCHAND ET AL 2,634,317
APPARATUS FOR DETERMINING THE ORIENTATION
OF UNDERGROUND STRATA FROM CORE SAMPLES
Filed Feb. 24, 1950 3 Sheets-Sheet 3

Inventors
Joseph A. Marchand
John Platis

By Clarence A. O'Brien
and Harvey B. Jacobson
Attorneys

UNITED STATES PATENT OFFICE 2,634,317

APPARATUS FOR DETERMINING THE ORIENTATION OF UNDERGROUND STRATA FROM CORE SAMPLES

Joseph A. Marchand and John Platis, Corpus Christi, Tex.

Application February 24, 1950, Serial No. 146,062

3 Claims. (Cl. 175—183)

This invention relates to a method and means for the geological exploration of deep earth strata and it has more special reference to the determination of the dip and strike of strata which are encountered when drilling oil wells or during other mining or excavating operations and it has for its primary purpose to provide a method and apparatus for determining the amount and direction of the dip of strata safely and accurately and by means of data furnished by a single well or bore hole from which core samples are taken at the stratum to be explored which are afterwards brought to the surface.

It is well known that the exact determination of the natural location and orientation of deep earth strata is of primary importance for the successful direction of oil well drilling or ore mining operations and a number of methods have therefore been developed by means of which a continuous exploration of the deep earth strata during the boring or excavating operation may take place. While geological exploration is relatively simple in the event that a plurality of wells can be explored simultaneously in which the same strata may be encountered at different depths the problem of determining the dip and strike of deep earth strata becomes much more difficult in the event that data from a single bore hole or well are available. A number of methods have therefore been developed measuring electrical properties by means of currents sent through the strata in question or measuring the magnetic properties of the strata through which the digging, boring or other excavation takes place. Moreover seismic methods have been used. However, while most of these methods furnish information relative to the nature and to the thickness of the strata explored only a few of them furnish data relative to the exact location and orientation of the strata in space.

Where exact knowledge of the dip and strike of deep earth strata is considered as vital for successful operations the method of core sampling has been suggested according to which a sample of the rocks or formations encountered is obtained at the desired depth within the well or bore hole as often as necessary. This sample is obtained in the form of a core and if the cutting of the core takes place in a predetermined position with respect to the axis of the bore hole or with respect to the vertical and if the exact position of the core axis is maintained while the core is removed from the stratum and is moved to the surface then any stratification shown by the sample allows to determine the exact dip and strike of the strata from which the core was removed with consequent advantages for the direction of further drilling or mining operation.

However it is extremely difficult and practically impossible to bring the core to the surface without changing its relative position with respect to a vertical or horizontal coordinate system. Breaking and accidental turning of the core in the barrel receiving the core is practically unavoidable and cannot be easily recognized. It was therefore necessary to develop methods by means of which the original orientation could be detected if it has been lost accidentally. Said methods are based on the fact that sedimentary earth strata have connate magnetic properties usually ascribed to the inclusion of magnetic mineral particles during the period of sedimentation. These particles oriented themselves under the influence of the magnetic field of the earth during sedimentation or became permanently magnetized and magnetically polarized in the geological periods following such sedimentation. It was also found that igneous rocks display magnetic properties because they include crystals of magnetic material which crystallized during the cooling of the rocks.

The magnetic orientation of the core when removed is of course the same as that which the core material had in situ. The magnetic properties of the samples therefore permit reconstruction of the orientation of the sample occupied before removal.

The methods thus far developed made it necessary to label the core at the well in order to make it clear what was the top and what was the bottom of the core. Mistakes in labeling and handling the cores are however unavoidable and therefore the number of cases in which the top is mistaken for the bottom and vice versa is large. Such a mistake cannot be corrected as the general direction of the field does not reveal it. If for instance the top is mistaken for the bottom the cross section of stratum remains on the same side of the sample but if the dip of the stratum was, for instance, northwesterly the mistake would change it to a southeasterly dip so that the dip is reversed. Obviously such errors cause great inconvenience.

The method according to the invention consists in a further development of known methods for determining the orientation of a magnetic field in a core sample which permits to eliminate such errors and to obtain reliable and safe results even in the event of accidental changes. Moreover the invention permits to dispense with the elaborate system for labelling the core samples which have to be used. The method according to the invention permits the detection of the original orientation of the magnetic field of a core so that it is possible to safely establish the orientation of the magnetic field of the sample before it was removed, in view of the fact that the magnetic field of the stratum from which it was removed was produced by the magnetic field of the earth which acted upon it. As the inclination and declination of the magnetic field of the earth at the spot from which the sample was taken is known it is thus possible to reconstruct the original orientation of the core sample with a high degree of accuracy.

The method according to the invention essentially consists in rotating the core sample having some magnetic properties rapidly in two different steps or operations in two different planes which are at right angles to each other and which are preferably a vertical and a horizontal plane, such rotation taking place within a stationary armature provided with a coil and in recording the current fluctuations produced in the coil during rotation. Such record, according to the invention, is made within a system of coordinates which is correlated with the movement of the core sample around its axis of rotation, thus permitting the determination of the exact position of the plane of polarity of the sample relatively to a horizontal and a vertical plane within which the axis of the core sample was located during rotation the last named determination eliminating mistakes about the original position of the top or bottom of the core and due to the accidental turning of the core within its barrel.

The method which has been above described is carried out by means of apparatus which are shown by way of example in the accompanying drawings. It is however to be understood that the example shown in the drawings has been provided in order to explain the method used and the principle of the invention and the best mode of applying the principle. Obviously, apparatus different from the one shown in its constructive details may be used and the modification of the apparatus shown by way of example is therefore not necessarily a departure from the essence of the invention.

In the drawings:

Figure 3 is a plan view of the same apparatus.

Figure 5 is a vertical section through a core sample illustrating the method of determining the dip of the strata.

Figure 6 is a plan view of the core sample as illustrated in Figure 5.

Figure 7 is a view of the strip of sensitive paper or film on which a record has been made.

Figure 1:
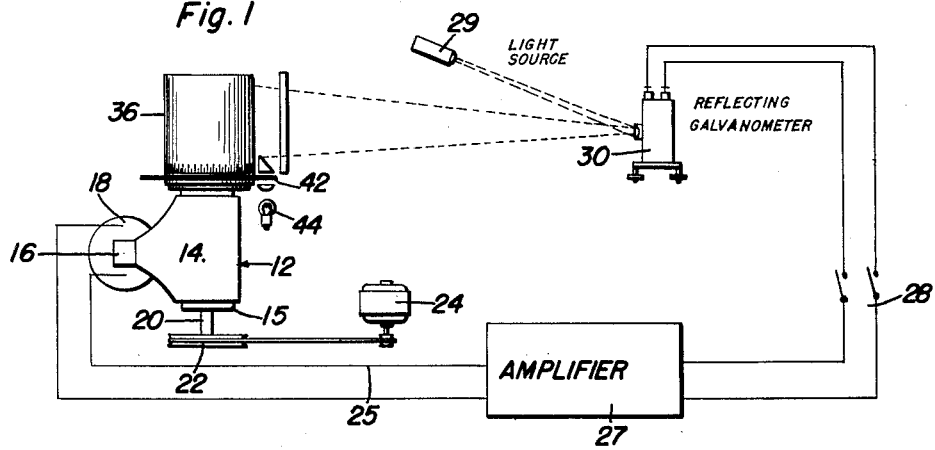
Figure 1 is a diagram illustrating the general arrangement used for carrying into effect the method according to this invention.

The apparatus for carrying out the method according to the invention is shown in Figure 1 diagrammatically. It comprises a stationary armature structure 12 of any suitable type with pole pieces 14 surrounding the core sample container 15 of non-magnetic material. The two pole pieces are joined by a yoke 16 carrying a coil 18. The core sample container 15 is rotatably mounted within the pole shoes and may be rotated by means of a shaft 20 carrying a pulley 22 driven by a motor 24. When the motor 24 rotates the core sample container 15 containing a core sample it will be clear that the feeble magnetization of the core in the container will produce a change of inductance in the coil which in its turn produces a feeble alternating current of sinusoidal wave form. The phases of the current are related to the position of the plane of polarity of the magnetized core relatively to the poles of the field magnet. A rapid rotation of the core container therefore produces an A. C. of a frequency which will be proportional to the speed of rotation. The current thus produced flows through the line 26 to the amplifier 27 and after amplification to the line 28 and to a reflecting galvanometer 30, the movable mirror of which is illuminated by a light source 29. The ray from the source 29 reflected by the mirror of the galvanometer therefore produces a photographic record of the current fluctuation on a sensitive paper or film 40 which is carried by a drum 36.

In order to carry out the method according to the invention the points of the sine curve must be exactly correlated with points on the core held in the container. A scale connected with the rotating container 15 may therefore be used to produce a reference system simultaneously with the production of the curve representing the current fluctuation on the sensitive paper or film. This may be done by using a transparent scale on an opaque background turning with the container and illuminated by a stationary source of light 44. The division of this scale at any given moment can therefore be correlated to a point of the curve which has been produced simultaneously with said division.

From the above it will be seen that the polarity of the core will determine the fluctuation of the wave current and more specifically the passage of the pole of the core through the pole pieces produces the maximum of intensity of the locally induced field and will produce the crest of the curve representing the current. Therefore as this point can be easily located by means of the scale on the container and on the core it is possible to provide the latter with a mark indicating the exact location of the pole in the plane perpendicular to the axis of rotation.

If it is assumed that rotation is taking place around the axis of the cylindrical core shown in Figure 5 it will be possible without difficulty to locate the plane of polarization indicated at N–S in Figure 6. Let it now be assumed that the declination and inclination of the magnetic field of the earth is known and that for instance the plane of magnetic polarity is at 328° from the line of reference which the geologist intends to use. Then the dip of stratification which can be detected on the core may be determined if it is certain which side of the core is the top and which is the bottom of the core in its original position.

It will be readily understood that it is absolutely necessary to determine the top and bottom of the core before determining the dip of the strata. The layer whose dip is shown in Figure 5 and which dips toward the left with a maximum dip at N-32°-W would still be to the left if the core is turned upside down but the dip will now be S-32°-E. Therefore the dip would be reversed. A second step is therefore necessary according to the invention to determine the original top and bottom position.

Figure 10:
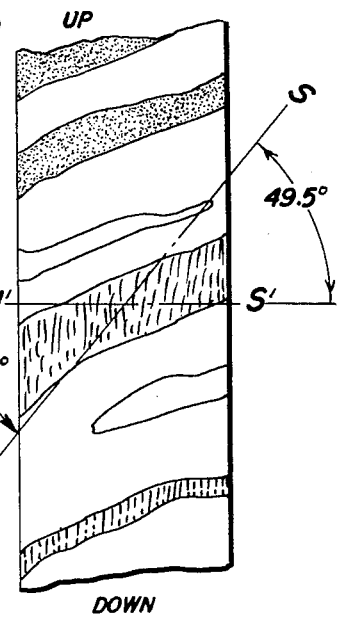
Figure 10 is a view of the core sample showing the direction of the magnetic polarization as determined by the apparatus illustrated in Figure 8.

The core is therefore again rotated within the stationary armature but is now placed with its longitudinal axis at right angles to the position which was occupied in the first step. Again the magnetic polarity of the core will be indicated by the passage of the pole through the maximum magnetic field intensity and will be represented by the crest of the wave showing the fluctuation of the current. The localization of the crest with respect to the core container and to the core is again produced by the scale fixed on the container and cooperating with the stationary source of light. Thereby a second plane of polarity is located on the core. This plane is now inclined with respect to the longitudnial axis of the core as shown in Figure 10. On account of this inclination and on account of the fact that in the northern hemisphere, for instance, the north pole is always on the lower side it is possible to determine the position of the core and the bottom of the core will always be closer to the north pole than its top.

It is thus seen that the above described method provides a complete indication of the direction and amount of the dip of any stratification which may be detectable on the core sample.

This method may be carried into effect by visual indicating means, permitting to observe the maximum and minimum deflection and to note its location on a scale which rotates together with the core sample. To facilitate the reading a so-called strobotron lamp may be used which is a glow lamp fired merely intermittently by current impulses. If amplified currents are used, the maximum (or minimum) of which fires the lamps, the points on the scale on which the maximum and minimum voltages occur and on which the lamps fire seem to remain stationary at a suitable rotational speed of the core and these points can therefore be readily determined.

The method may however also be carried out by using means producing a permanent record and such means permit to obtain a high degree of precision. Such means are shown in Figures 2 to 12 respectively.

Figure 2:
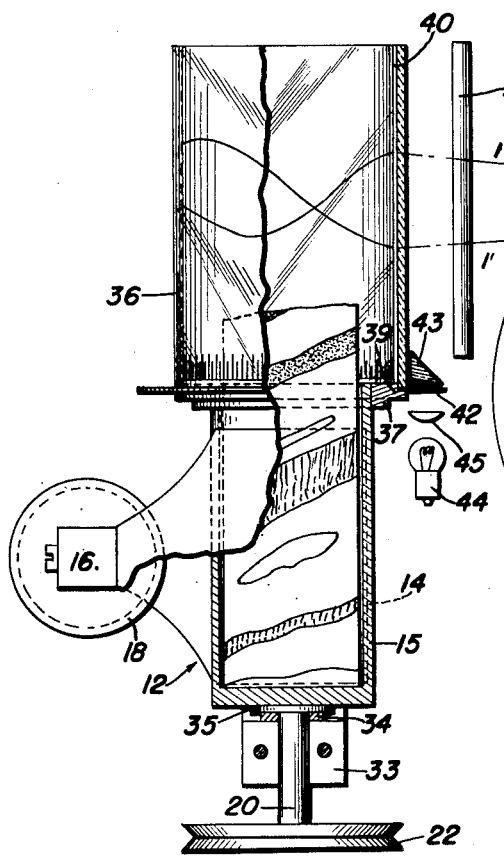
Figure 2 is a partly sectional elevational view of the core sample container and record containing cylinder of the apparatus for determining the polarity of a cylindrical core sample in a plane perpendicular to its axis.
Figure 4:
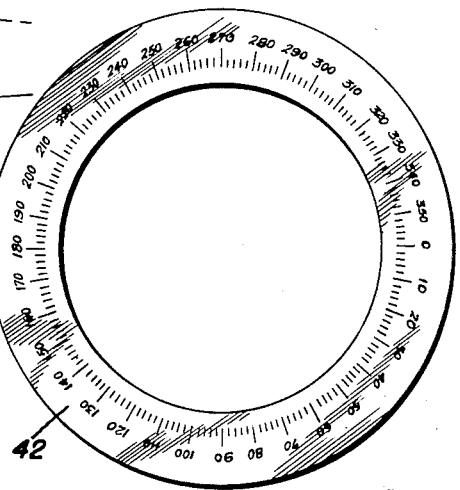
Figure 4 shows a plan view of the scale attached to the core sample container.
Figure 8:
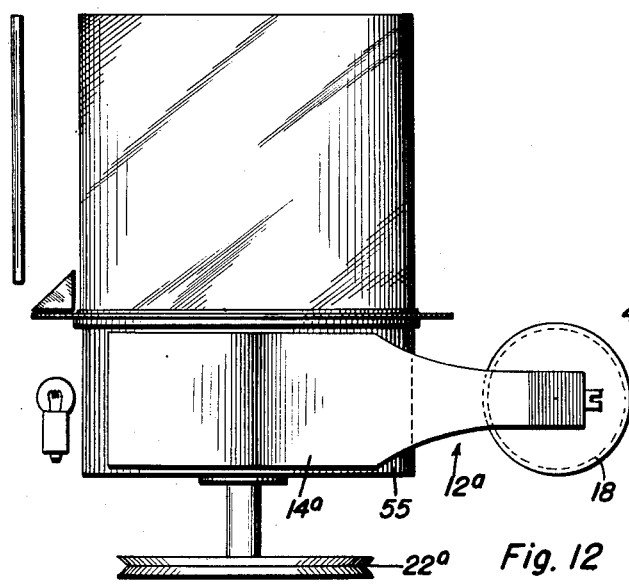
Figure 8 is an elevational side view of the apparatus by means of which the core sample may be rotated around an axis which is perpendicular to its longitudinal axis.
Figure 9:
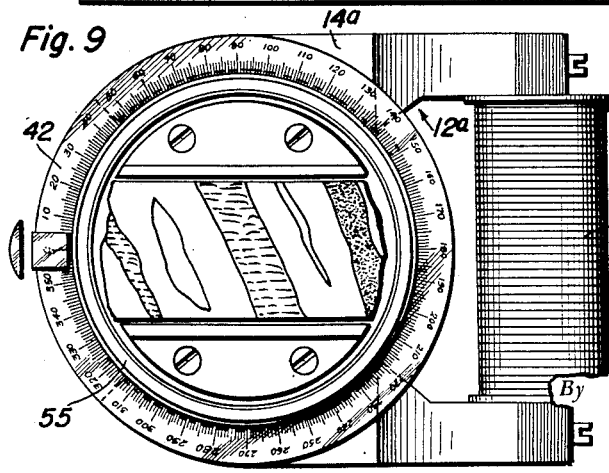
Figure 9 is a plan view of the apparatus shown in Figure 8.
Figure 11:
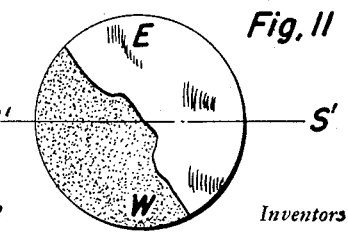
Figure 11 is a plan view of the core sample.

More specifically, the two devices which are used in the two steps are shown in more detail in Figures 2 and 3 and in Figures 8 and 9 of the drawing respectively. The devices shown are very nearly identical, except that the core sample container is so constructed that the core sample is placed in different positions of the core axis relatively to the axis of rotation in the two devices. As already mentioned the apparatus comprises a stationary armature structure 12 provided with two pole shoes 14 joined by the yoke 16, a structure which is preferably laminated as shown in Figure 3. The yoke 16 carries an induction coil 18 which is preferably of high impedance.

The two pole shoes 14 partly encircle the cylindrical core sample container 15 which is made of a non-ferro-magnetic and magnetically non-permeable material. In the example illustrated in Figure 2 the container rotates around an axis which is coincident with the axis of the cylindrical core. The core sample therefore rotates around its longitudinal axis.

The container is supported on a shaft 20 passing through bearings 33 which hold the shaft against rotation and which also form a thrust bearing supporting the shaft and container 20 by means of a ring 34 supporting a collar 35 fixedly mounted on the shaft. The shaft is provided with a pulley 22 at its lowermost end. This pulley is driven by means of a belt from the motor 24.

On the upper side of the container 15 a ring 37 is mounted which supports the transparent record block or cylinder 36 arranged coaxially with the container 15. The transparent cylinder may be made of glass or plastic and is preferably open at the top so that through the top a sensitized paper or film 40 may be inserted which is so cut and placed in the cylinder that the sensitive surface is applied against and is in contact with the inner surface of the transparent cylinder 36.

The cylinder is preferably carried by the flange 37 and is held by a stepped portion 39 of the flange by friction only and without any special fixation means so that the cylinder may be readily mounted and removed from the container.

On one side of the cylinder a cylindrical lens 38 is arranged through which the light rays of the source 29 reflected by the galvanometer fall and which concentrates the rays to a narrow bundle before they impinge on the transparent cylinder containing the record.

The correlation scale 42 may be a transparent scale with non-transparent graduations or a non-transparent scale with transparent graduations. This scale is shown in detail in Figure 4 and it projects laterally from flange 37 on the core sample container 15. Above said scale a stationary reflecting prism 43 is arranged, reflecting the light of the stationary source of light 44 which may be concentrated into a narrow beam by a lens 45. Prism 43, lens 45, lamp 44 are only diagrammatically indicated. They are carried by the supporting structure of the device which is not shown.

During the rotation of the cylindrical core sample the impedance of the coil 18 varies with the position of the plane of polarity of the core relatively to the stationary armature. A varying E. M. F. is therefore produced which acts on the galvanometer and the light ray reflected by the galvanometer acts on the sensitized paper or film strip 40 through the transparent cylinder 36 and produces the curve 50 which is a sinusoidal curve as shown in Figure 7.

Simultaneously the scale 42 which rotates with the cylinder passes the light ray emitted by the stationary source of light and the reflection prism 43 and is depicted on the sensitive paper or film strip 40 so that each point of the curve will be directly correlated with the generatrix of the cylinder core, thus permitting to locate a N-S plane which corresponds to the upper maximum of the curve shown in Figure 7. The point may be marked on the core as already described.

The construction of the device shown in Figures 8 and 9 is essentially the same except that the pole pieces 14a of the stationary armature 12a are so arranged that they encircle the container 55 into which the core sample has been placed with its longitudinal axis arranged along the diameter of the container. The core sample therefore during this step turns around an axis which is perpendicular to the axis to which it must turn in the device shown in Figures 2 and 3.

As a result the inclination of the axis of magnetic polarity towards a plane perpendicular to the core axis can be determined. The inclination of this axis determines the top and bottom of the core, as has been explained above; the end of the core which is closer to the north pole is always the bottom end in the northern hemisphere.

The devices are preferably calibrated before use by means of a piece of magnetic material of known polarity inserted into the core container.

The devices are moreover shielded by encasing them in iron casings or by placing them behind ferro-magnetic shields in order to exclude the action of accidental stray fields.

Figure 12:
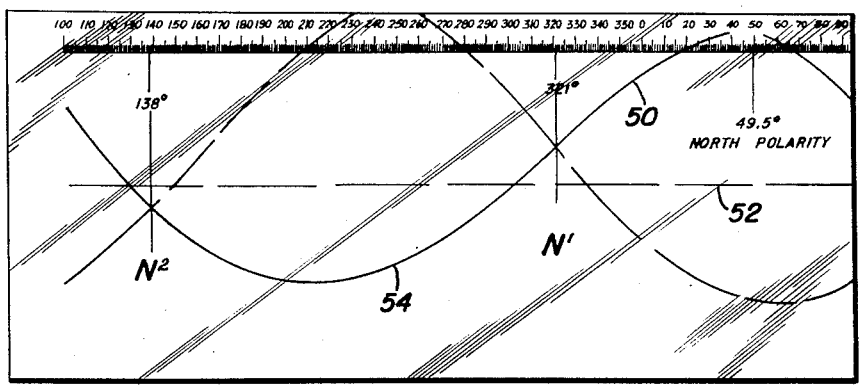
Figure 12 shows a strip of film of sensitive material on which the recording is made in the apparatus shown in Figures 8 and 9.

For the determination of the polarity with the greatest possible accuracy it is moreover preferable to produce first a base line of a current, such as the base line 52, Figures 7 and 12. This may be done by proceeding as above described, but by cutting off the connection at 28 while rotating the cylinder 36 with a sensitive strip 40. The line thus described by a light beam should be a straight line after the strip has been flattened. Preferably such a base line is obtained by rotating the core container in both directions. Such a line may serve to eliminate the slight variations or the accidental effects of the adjustment of the galvanometer.

It has been mentioned that the magnetization of the core is sometimes rather feeble. In such cases clear and accurate readings can only be obtained if the core samples are rotated at considerable speed. The use of a high speed of rotation is however likely to produce a distortion of the wave formed. Moreover, also the galvanometer characteristics or the lagging of the indication at high speed may be the cause of a further distortion of the curves. These inaccuracies are disturbing in actual practice and constitute a serious problem, preventing the use of high speed and thereby the application of the method to cores the magnetization of which is extremely feeble.

The accuracy of the reading is of course improved by taking the mean between the two crests of the wave for instance. However this does not produce a sufficient accuracy in the case of high rotational speed if distortion of the wave has been produced.

According to the invention, therefore, the sample cores are rotated in two different and opposite directions at the same constant speed in two successive runs, and the curves for the forward and reverse directions are registered on the sensitive paper or film strip or other record by the same galvanometer. Of course, also the same degree of amplification in the amplifier is used so that the amplitude of the current acting on the galvanometer is identical during both runs.

In such a case, as shown in Figure 7 for instance, two curves 50 and 54 are formed on both sides of the base line 52 and their nodal points $N_1$ and $N_2$ may now be taken as a base for the determination of the polarity instead of the intersection points of the curve with the base line or the mean between the two crests. The mean between the two nodal points $N_1$ and $N_2$ gives the true position of the crest and the distortion cancels itself out.

Preferably the operator, before proceeding with the registration of the two curves, first records the base line 52, as above described. In such a case the strip will show the two curves 50 and 54 and the base line 52 as seen in Figures 7 and 12.

In Figure 7 the different results obtained by different methods have been marked. The crest of the wave marked CW places the north polarity in the example shown in Figure 7 at 50° of clockwise rotation. The counter-clockwise rotation gives the value of 66.5°. The mean value between these two values would therefore be 58.2°. However by using nodal points the correct value obtained is 63.5° which is approximately the true value which may be checked with a sample the polarity of which has been artificially produced and is known.

The method and apparatus as described has not only the great advantage of accuracy and of the elimination of errors and of the consequences of accidents changing the position of the core but they also permit the manipulation without any difficulty. The transparent cylinder of glass or plastic may be easily inserted and removed and the sensitive strip of film may be inserted into the cylinder, and the cylinder may be inserted into the container, without any regard to their position or to marks or to mechanical means for holding them in position. The correlation is produced automatically and photographically in any position with the apparatus above described. The sole manipulation which is required and which is to be performed by the operator consists in the marking of the core after the measurement has been made, an operation which is performed by rotating the container with the marking discs and scales to the observed degree of the arc on the scale, then marking the core at the place obtained.

It will be clear from the above that the constructional details of the apparatus described are partly unessential and that their construction may change without in any way departing from the invention as defined by the annexed claims.

Having described the invention, what is claimed as new is:

1. An apparatus for determining the magnetic orientation of core samples taken from earth formations encountered during bore hole drilling or excavating operations in one plane, comprising a stationary armature with two pole pieces facing each other joined by a yoke, a coil on said yoke, a rotatable core sample container holding the core sample between the two pole pieces of the armature, an amplifier and a reflecting galvanometer, the former connected with the coil and the latter connected with the amplifier, means for rotating said core sample container, a light source cooperating with the galvanometer, a light sensitive record strip carried by said core sample container and illuminated by a light ray reflected by the galvanometer, a further stationary source of light, a transparent scale for recording on the same record strip the angular position of the core sample container at each moment during rotation, along with the record of the current fluctuations recorded by the galvanometer.

2. An apparatus for determining the magnetic orientation of substantially cylindrical core samples taken from earth formations encountered during bore hole drilling or excavating operations in one plane, comprising a stationary armature with two pole pieces facing each other and joined by a yoke, a coil on said yoke, a cylindrical core container for holding a core sample, rotatable between the pole pieces, a transparent cylindrical container detachably connected and coaxial with said core sample container, said cylindrical container receiving in its interior a light sensitive record strip, having its sensitized surface turned toward the transparent cylinder enclosing the strip, means for rotating said core sample container, a graduation scale with transparent and opaque portions, arranged in the plane of rotation and attached to said core sample container, a stationary source of light and light deflecting means in operative relation to said scale for photographically reproducing graduation marks on the record strip held in the transparent cylinder, said marks corresponding to the angular position of the rotating core sample container, an amplifier connected with the coil, a reflecting galvanometer connected with the said amplifier, a source of light cooperating with said reflecting galvanometer, said galvanometer and light source being positioned for recording the fluctuations of the current produced in the coil on the strip contained in the transparent cylinder.

3. A device for determining the magnetic orientation of substantially cylindrical core samples taken from earth formations, comprising means for rotating a cylindrical core sample around the axis of the cylindrical sample in both directions, means for rotating the same core sample around an axis at right angles to the axis of the cylinder in both directions, an armature provided with pole pieces and a coil for each of said means, means for supporting a sensitized record strip connected with each of the said aforesaid means for rotating a cylindrical core sample along a transparent cylinder surface, having its axis arranged in the axis of rotation, a galvanometer with a reflecting mirror cooperating with each of said aforesaid means, an exciter lamp associated with said reflecting galvanometer, the latter recording the current fluctuations occurring during rotation in each direction on the same sensitized record strip, and means for correlating each point of the record made on the sensitized record strip to a definite angular position of the core sample during rotation, said means including a partly opaque and partly transparent graduation scale, arranged in a plane perpendicular to the axis of rotation, an exciter lamp on one side of the said scale, and light deflecting means on the other side of the graduation scale, said means deflecting the light penetrating through the scale towards the record strip and thus recording the angular position of the current fluctuations recorded by the reflecting galvanometer.

JOSEPH A. MARCHAND.
JOHN PLATIS.

REFERENCES CITED

The following references are of record in the file of this patent:

UNITED STATES PATENTS

| Number | Name | Date |
|---|---|---|
| Re. 17,790 | Pierce | Sept. 2, 1930 |
| 1,713,226 | Hall | May 14, 1929 |
| 1,871,709 | Legg | Aug. 16, 1932 |
| 1,883,907 | Hathaway | Oct. 25, 1932 |
| 1,901,186 | Norworth | Mar. 14, 1933 |
| 2,104,752 | Lynton et al. | Jan. 11, 1938 |
| 2,211,158 | Pearson | Aug. 13, 1940 |
| 2,260,562 | Dillon | Oct. 28, 1941 |
| 2,469,423 | Wise et al. | May 10, 1949 |
| 2,549,150 | Willis | Apr. 17, 1951 |

FOREIGN PATENTS

| Number | Country | Date |
|---|---|---|
| 503,849 | Great Britain | Apr. 14, 1939 |